US006061625A

United States Patent [19]

Fastenrath

[11] Patent Number: 6,061,625

[45] Date of Patent: May 9, 2000

[54] PROCESS FOR OBTAINING TRAFFIC DATA

[75] Inventor: Ulrich Fastenrath, Düsseldorf, Germany

[73] Assignee: Mannesmann AG, Düsseldorf, Germany

[21] Appl. No.: 09/117,554

[22] Filed: Jul. 31, 1998

[30] Foreign Application Priority Data

Feb. 8, 1996 [DE] Germany .......................... 196 06 307

[51] Int. Cl.[7] .......................... G06F 19/00; G06G 7/70; G06G 7/76; G08G 1/00

[52] U.S. Cl. .......................... 701/117; 701/119; 701/121; 342/454; 342/461

[58] Field of Search .......................... 701/20, 35, 93, 701/110, 117, 119, 120, 121; 342/36, 46, 454, 456, 461; 340/909, 910, 916, 924; 348/143; 382/104

[56] References Cited

U.S. PATENT DOCUMENTS

| | | | |
|---|---|---|---|
| 3,655,962 | 4/1972 | Koch | 246/182 C |
| 5,136,516 | 8/1992 | Twombly | 701/20 |
| 5,487,350 | 1/1996 | Chace, Jr. et al. | 114/330 |
| 5,629,854 | 5/1997 | Schulte | 701/207 |

*Primary Examiner*—Tan Nguyen
*Assistant Examiner*—Gertrude Arthur
*Attorney, Agent, or Firm*—Cohen, Pontani, Lieberman & Pavane

[57] ABSTRACT

A process for obtaining traffic situation data in a compressed form, while largely maintaining the reliability of the data, whereby a speed profile for a vehicle that moves in traffic and belongs to a sampling vehicle fleet ("floating car") is found and transmitted wirelessly to a traffic center from time to time. The has the following features:

a) The current speed of the vehicle is found continually in the vehicle.

b) In the vehicle, characterizing numbers that characterize discrete segments of the vehicle speed profile are found from the current speed values, which characterizing numbers are characteristic of the curve of the speed actually travelled in the given segment.

c) The discrete segments of the speed profile are formed continuously during the vehicle trip, in that the end of a current segment, and thus the beginning of a new segment, is defined on the basis of the results of a comparison between the speed profile of the vehicle and the speed profile of at least one virtual reference vehicle.

d) When a new segment begins, the characterizing numbers of the segment just finished are stored in the vehicle at least until being transmitted to the traffic center.

23 Claims, 2 Drawing Sheets

PROCESS FOR OBTAINING TRAFFIC DATA

BACKGROUND OF THE INVENTION

1. Field of the Invention

The invention relates to a process for obtaining traffic data in a compressed form, while largely retaining the reliability of the data. A speed profile is determined for and in a vehicle moving in traffic, which belongs to a sampling vehicle fleet, and the data are transmitted wirelessly to a traffic center from time to time.

2. Discussion of the Prior Art

Such sampling fleet vehicles that move in traffic as measurement probes are called "floating cars." Using many such "floating cars," it is possible in principle to operate a system for obtaining traffic data. An effort is thereby made to collect the traffic situation data as completely as possible, so that information derived from the obtained data will be reliable and informative. The object of the invention is to provide a data base for traffic information, on the basis of which drivers can plan their driving movements, with respect to time and place, in such a way that their routes can be travelled in the shortest possible time and without interference from traffic jams, for example. To this end, it is important that the drivers be informed accurately and in a timely manner about existing or developing traffic jams, for instance. This is a central task of telematic traffic services provided to drivers via wireless communications paths.

When traffic situation data are collected, it is essential that changes in the current traffic situation in the immediate vicinity of a "floating car" be recognized by the "floating car" and transmitted to the traffic center as quickly as possible, so that the overall traffic picture can be kept as up-to-date as possible. When attempts are made to keep the sensor system of a "floating car" simple (for example, by not installing cameras or distance detectors in the car), perhaps for reasons of cost alone, the traffic environment in which the "floating car" finds itself is not visible. However, the speed data of the vehicle are easily detectable in the vehicle, and highly useful and generally adequate information can be obtained by continuously observing changes in these speed data. Unfortunately, when such speed data are transmitted to a traffic center, usually via the data transmission paths of a mobile telephone network, the abundance of data, and thus the load placed on the transmission channels, can be extraordinarily high, given the large number of sampling vehicles needed. As a result, the costs of implementing a suitable process for obtaining traffic data can assume a magnitude that precludes practical applicability. A series of proposals have therefore already been made on how to limit data volume. These efforts often entail, however, a conflict of goals that has not been satisfactorily resolved by previous processes. Specifically, in addition to the criterion of data completeness, the criteria of data volume minimality and data up-to-dateness must be taken adequately into account.

If "floating cars" report to the traffic center only periodically, it is usually possible, given suitably short reporting intervals, to obtain both data completeness and data up-to-dateness. However, the scope of transmitted data will not be minimal. If transmission intervals are lengthened, up-to-dateness suffers, while minimality is not actually achieved, because data of limited informative value will still be transmitted. In processes based on the identification of important traffic events by "fuzzy logic," the completeness of data collection is not ensured, because this procedure, by its nature, prevents any reconstruction of how the fuzzy-logic level was arrived at. Finally, data collection followed by approximation and information-theory compression (i.e., data compression without information loss) does not, as a rule, adequately meet the up-to-dateness criterion, because only when a large quantity of data is available can approximation and compression be carried out efficiently.

SUMMARY OF THE INVENTION

The object of the present invention is therefore to embody a process of the aforementioned type in such a way that the criteria of completeness, up-to-dateness and minimality are met to an extent not previously possible in obtaining traffic situation data.

The solution proposed by the present invention and explained below is based on the use of a virtual environment situated, as it were, around the respective "floating cars." The criterion of data minimality is ensured by means of intelligent data compression (i.e., not information-theory compression) in the vehicle and decompression in a computer at the traffic center. Up-to-dateness is ensured by intelligent recognition of important traffic events in the vehicle. The design of the virtual environment includes the definition of reference vehicles, whose speed profiles are compared with the speed profile of the "floating car" in such a way that suitable conclusions can be drawn for assembling the data to be transmitted to the traffic center. According to the invention, this is done as follows:

A "floating car" of a sampling fleet determines its current speed v continually (e.g., at short fixed time intervals). From the current speed values v, characterizing numbers that characterize discrete segments of the speed profile are found in the vehicle. These characterizing numbers characterize the curve of actually travelled speed v in each given segment. A vehicle speed profile can be created, for example, in dependence on the route travelled. It is recommended, however, that the speed profile be created as a function of time (v(t)). The discrete segments of the speed profile are created continuously as the vehicle travels. The end of a current segment, and thus the beginning of the next segment, is defined by comparing the vehicle speed profile with the speed profile of at least one virtual reference vehicle.

There are many possible ways to compare these profiles, as will be discussed in greater detail below. When a new segment begins, the characterizing numbers of the previous segment are stored in the vehicle at least until being transmitted to the traffic center. Moreover, there are many possible ways to establish the timepoints of data transmission, as will also be discussed below. The characterizing numbers that characterize the speed profile should, at the least, clearly indicate the beginning and end of each given segment as well as the average value of the vehicle speed in that segment ("average segment speed"). Because the beginning of one segment is the end of the previous segment, it would suffice, in principle, to indicate only the beginning or end of a segment. However, it is sometimes advantageous to transmit data on both. In principle, any desired process of averaging (e.g., geometric averaging) can be used to determine the average segment speed. Preferably, arithmetic or sliding averages are used in the framework of the present invention. In addition to the average segment speed of the "floating car," other data should be transmitted, including data on the variability of the vehicle speed in a given segment. Specifically, it is useful to transmit data on the variance of the current speeds v(t).

It is recommended that, starting at a fixed point of the trip, particularly the beginning of the trip, an average travel speed be derived in the "floating car" from the speeds actually travelled. Further, a first virtual reference vehicle that moves at this average speed should be defined. Again, while any desired process can be used to arrive at this average value, the average travel speed is preferably found as an arithmetic or sliding average. The average travel speed necessarily changes when the vehicle speed changes. The virtual reference vehicle moving at the average travel speed is referred to in what follows as the "Type I" reference vehicle. To create the individual segments of the "floating car" speed profile, the following procedure is recommended:

A checking procedure to determine whether a new segment should be created is initiated each time the current speed of the vehicle and the current travel speed of the Type I virtual reference vehicle fulfill a given first relation. Subsequently, either this checking procedure ends with a positive result, i.e., with the creation of a new speed profile segment, or else the checking procedure is interrupted when the current speed of the vehicle and the current travel speed of the Type I virtual reference vehicle fulfill a given second relation. The first and second relations can have different contents, but are preferably the same. It has proved useful for the first relation to be equality between the current speed of the "floating car" and the current travel speed of the Type I reference vehicle. However, it is also possible to initiate the checking procedure when the respective speed profiles of the "floating car" and the Type I reference vehicle approach one another to a certain predetermined extent. In an advantageous embodiment of the process according to the invention, the checking procedure can be designed so that a new segment is always defined-and thus the checking procedure is terminated with a positive result-whenever the respective distances travelled by the "floating car" and the virtual reference vehicle since the start of the checking procedure differ by more than a predetermined first threshold value. In this case, the starting time of the checking procedure is used as the beginning of the new segment. The checking procedure makes it possible to observe instances of "passing," so to speak, between the "floating car" and the Type I virtual reference vehicle. When the "passing" vehicle gets far enough ahead of the "passed" vehicle, a change in the traffic situation in the immediate vicinity of the passed vehicle is assumed, and a new segment is created. On the other hand, if the passed vehicle catches up with the passing vehicle (achieving equality of distance in the sense of the second relation), or even passes it or draws sufficiently close to it (based on the approach standard of the second relation, for example), the checking procedure is interrupted with no result, i.e., the current segment continues on.

Different methods can be used in the "floating car" to arrive at the characterizing numbers that will be reported to the traffic center at the established times. For example, all of the speed values v(t) of the "floating car" for one segment can be temporarily stored in a data memory carried in the vehicle. Then, after this segment ends, its characterizing numbers can be found. However, the continuous determination of the characterizing numbers by means of value updating (application of recursion formulas) is especially preferred. In this case, characterizing number determination for a potential new segment can be initiated parallel to the characterizing number determination in progress for the ongoing segment, and the results already obtained for the ongoing segment can be temporarily stored should a new checking procedure be initiated. The advantage here is that less memory is needed. The temporary storage of results when a new checking procedure begins is necessary because it is not known at this point whether a new segment will actually be created or whether the current segment will continue on.

It is advisable to implement the process according to the invention in a manner individually adjusted to the road type that the "floating car" is travelling on at a given moment. In other words, it is advantageous to establish different process parameters for different types of road, e.g., city streets, state and federal roads, autobahns or expressways. As a rule, the typical speed profiles for such different road types vary greatly. For example, the overall speed level on an autobahn or expressway is considerably higher than on a downtown city street. Of course, at certain times, as well as in certain regions, situations can arise in which the traffic conditions on an autobahn (e.g., in a congested area) resemble those on a major city street, for example. Similarly, the conditions on particular autobahns can be completely different at the beginning of vacation periods than at normal times, for instance. It can thus be advantageous, in a further embodiment of the invention, for the traffic center to wirelessly tell the vehicle which parameter settings are to be used by the process at the present time. To allow better adjustment to the different conditions on different types of roads, it is advisable, in advance, to divide the entire trip planned by a "floating car" into sections, such that a new section begins whenever the "floating car" changes to a road of a different type than the road previously travelled. The process according to the invention is then implemented with suitable parameter settings for each section. It is particularly advisable to establish the first threshold value (which relates to the distance between the "floating car" and the Type I reference vehicle and determines the definition of a new segment) in dependence on road type. This can be done by means of suitable presettings in a program memory in the "floating car"; as needed, changes can be made by means of a data message from the traffic center. It has also proved advantageous to determine the average travel speed of the virtual Type I reference vehicle separately for the individual sections of a trip, because doing so permits faster adjustment during the trip to the changed traffic conditions on a new type of road. It is not absolutely necessary to do so, because adjustment to changed traffic conditions will occur in any case. However, this adjustment can take quite some time under unfavorable conditions. In determining whether a "floating car" has changed from one road type to another, it is very advantageous to use a navigation device, which is carried along in the "floating car" and can provide such information on the basis of a digital road map. If such a navigation device is not available, recognition algorithms for the autonomous recognition of road types can be used in the vehicle. This method entails the analysis of driving data characteristic of the particular road type (i.e., speeds, accelerations, especially vertical accelerations, turn angles, etc.). Such algorithms have already been proposed and are not the subject matter of the present invention. Naturally, it is also possible for the driver of a "floating car" to input the applicable road type himself, e.g., by pressing a button on the electronic device carried in the vehicle to implement the process according to the invention.

Different methods can also be used to establish the timepoint of data transmissions to the traffic center. Most simply, the data that characterize the current vehicle speed v(t) profile, which are advantageously determined at short predetermined time intervals, can be transmitted each time a new segment is formed. However, this would not be the best solution with respect to data minimality. As a rule, it is considerably more advantageous to temporarily store the characterizing numbers of several segments. It is advisable to initiate data transmission, at the least, when the scope of stored data intended for transmission reaches approximately the size of the standard data packet in the particular mobile telephone network being used for transmission. This is the best solution in terms of cost, and can be applied even when other criteria can also lead to a data transmission. For example, it is especially advisable to transmit the stored data to the traffic center whenever the "floating car" falls below a predetermined minimum speed and, in addition, the distance travelled by the "floating car," starting from the time that the "floating car" falls below the minimum speed, differs by more than a predetermined second threshold value from the distance travelled in this same time by a second virtual reference vehicle (referred to hereinafter as the "Type II" reference vehicle) that is moving constantly at the predetermined minimum speed. Moreover, it is advisable to establish several minimum speed values (i.e., to define several Type II reference vehicles), for the purpose of identifying different traffic situations and/or in dependence on the travelled road type. As necessary, the traffic center can wirelessly change these minimum speed values or prescribe a certain value to the vehicle for current application. For example, to distinguish a normal traffic situation from a traffic situation that resembles a traffic jam (e.g., on a city street), minimum speed values other than those valid for an autobahn, where speed levels are normally much higher, are needed. Of course, several Type II reference vehicles can also be established for the same road type. For example, a Type II reference vehicle with a minimum speed of e.g. 20 km/h can serve to identify a traffic jam on an autobahn, while a reference vehicle with a minimum speed of e.g. 70 km/h is used to identify heavy traffic on the autobahn. In other words, a "floating car" recognizes a changed traffic situation because the "floating car" is passed, in the virtual environment, by the Type II reference car, and then falls farther and farther behind the reference vehicle, until the second threshold value is exceeded. Conversely, the "floating car" recognizes that a traffic jam has been left behind when the "floating car" itself passes the Type II reference vehicle, then distances itself therefrom. If one vehicle passes the other only temporarily, i.e., if the passed vehicle quickly catches up with the passing vehicle, so that the distance between the two vehicles does not grow, then no basic change is assumed in the traffic situation that prevails in the environment of the "floating car."

DETAILED DESCRIPTION OF THE PREFERRED EMBODIMENTS

Figure 1:
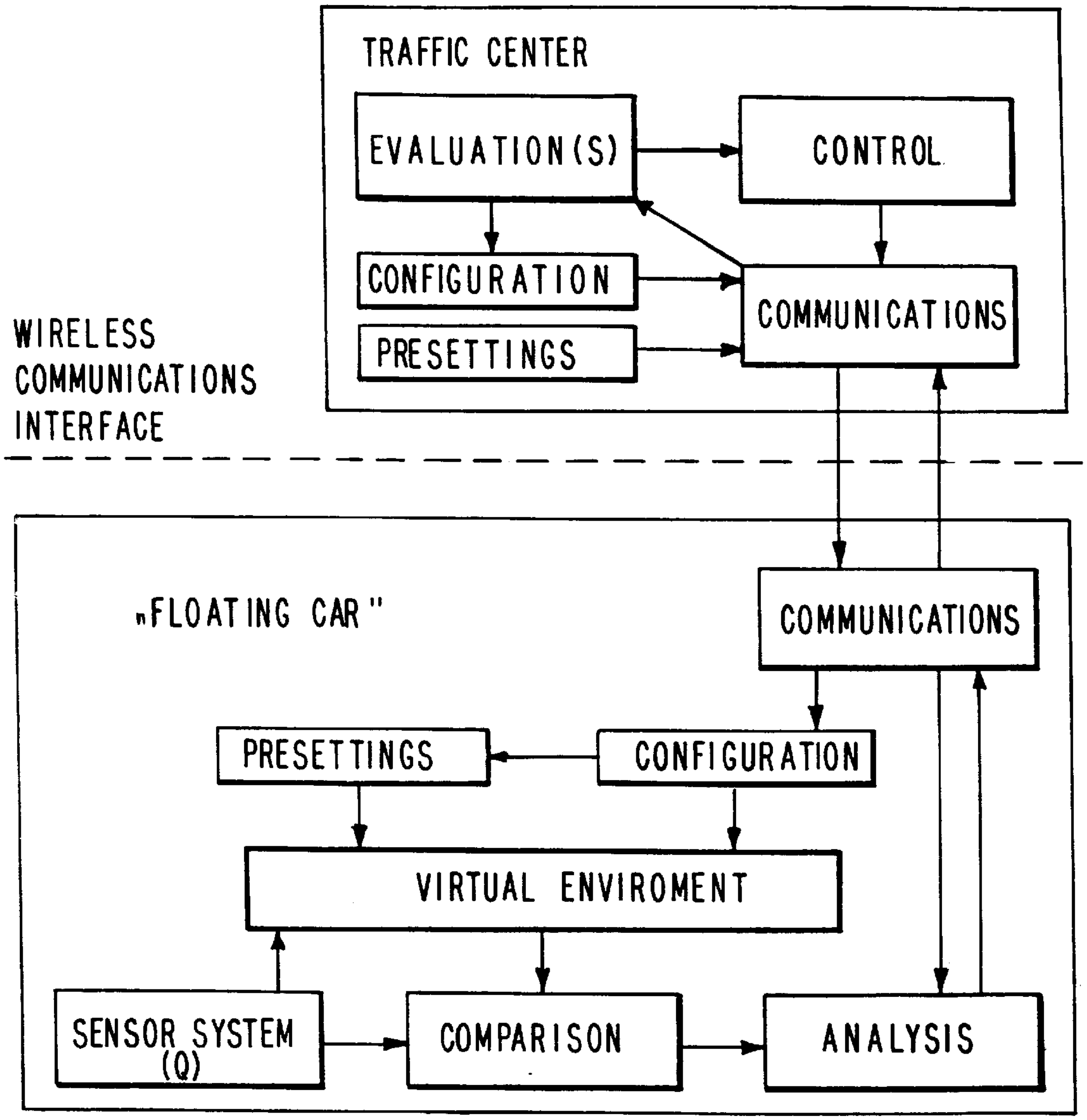
FIG. 1 Block diagram of the information flow in the process according to the invention.

In a schematic overview, FIG. 1 shows the function blocks of a traffic situation detection center ("traffic center") (upper half of drawing) and the function blocks of the individual "floating cars" dower half of drawing). Each "floating car" has a sensor system (Q), which performs the primary data collection, specifically, the collection of data on the current vehicle speed. The data collected by the sensor system are compared with the data of a virtual environment. The parameters that define the virtual environment in the sense of the present invention are established in advance by presettings, but can be changed as needed by the "Configuration" function block, upon instructions from the traffic center. These instructions are received wirelessly via the "Communications" function block. The results of the comparative operations are analyzed in the "Evaluation" function block, i.e., the data to be transmitted to the traffic center (the "characterizing numbers") and the timepoint of data transmission are determined here. The data transmission is sent to the "Communications" function block in the traffic center. From there, the transmitted characterizing numbers of the "floating car" speed profile are sent to the "Evaluation (S)" function block. There, a picture of the current traffic situation in the road network under observation is composed. The "Control" function block is provided to coordinate the individual data exchanges, particularly the transmission of presetting values ("Presettings" function block), as needed. When configuration changes are made, the previously valid presettings are written over.

Figure 2:
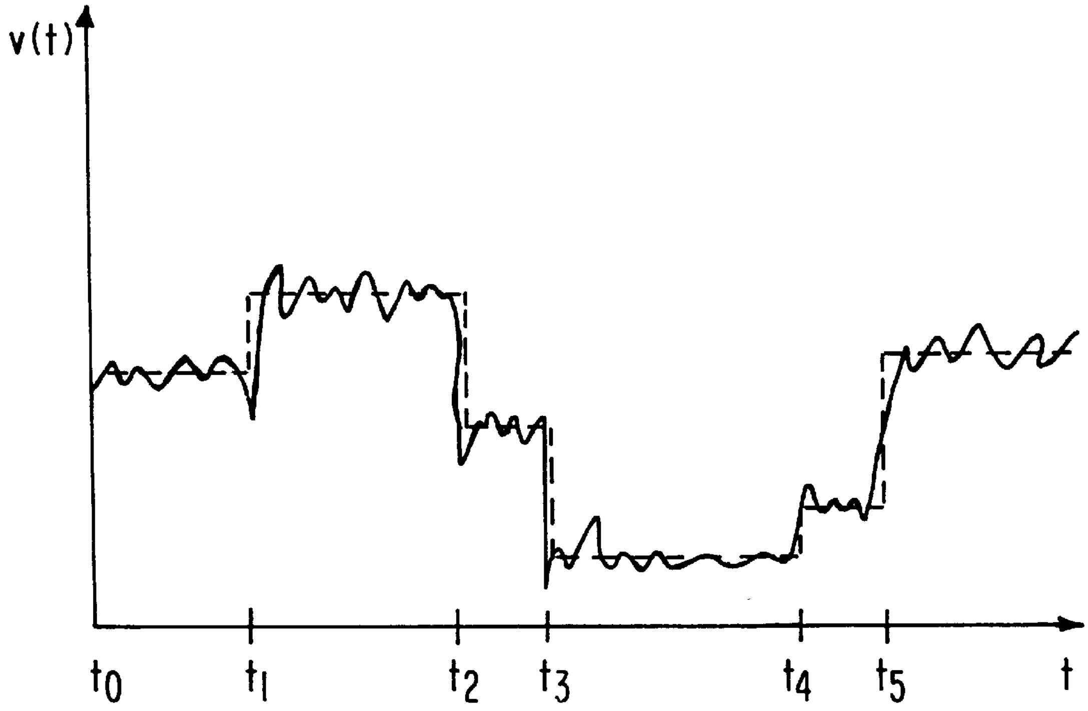
FIG. 2 Excerpt from a speed profile, with segments.

FIG. 2 shows, schematically, an excerpt from a speed profile v(t). To transmit this profile in realistic detail to a traffic center, a great number of individual data would be required. In the framework of the present invention, the scope of these data is drastically reduced. Instead of a precise speed profile with many small upward and downward spikes, only the approximate speed profile shown by the dashed line is transmitted. For the time period to to $t_5$, only five "average segment speeds" are transmitted, along with data indicating the variance in current speeds in the individual segments and the beginning and end of each segment. As a result, instead of several thousand values of individual speeds, for example, only 15 to 20 characterizing numbers are transmitted. Nonetheless, when analyzed, these few characterizing numbers provide a highly accurate picture of the actual conditions that existed when the speed data were recorded. Despite the extraordinarily high degree of data compression, the loss of information is slight. Moreover, the costs of data transmission are minimized. Finally, the up-to-dateness of the transmitted data can be ensured at all times, because the present invention provides for immediate data transmission to the traffic center should events occur that are particularly important for judging the traffic situation (e.g., traffic jam formation and dissolution). This is discussed in greater detail below.

Figure 3:
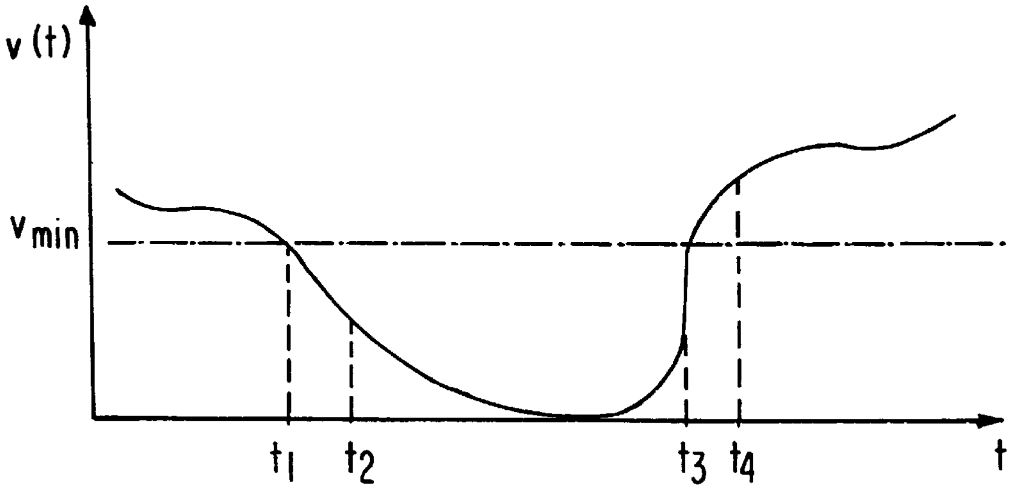
FIG. 3 Excerpt from a speed profile, with a traffic jam.

FIG. 3 shows a small excerpt from the speed profile of a "floating car." A speed $v_{min}$, for a virtual Type II reference point is shown by the dotted-dashed line. This Type II reference point is to be used in identifying a traffic jam situation. At timepoint $t_1$, the current speed of the "floating car" falls to the threshold value $v_{min}$, and then continues to fall. According to the invention, reaching or falling below this limit value results in a comparison of the respective distances travelled by the "floating car" and the Type II reference vehicle from timepoint $t_1$ on. At timepoint $t_2$, for example, the distance travelled by the Type II reference vehicle exceeds the distance travelled by the "floating car" by more than a predetermined threshold value. As a result, the "floating car" assumes that it has entered a traffic jam and, as needed, sends a corresponding message to the traffic center. In other words, at timepoint $t_2$, the Type II reference vehicle has not only passed the "floating car," but has left the "floating car" behind by a considerable distance. At timepoint $t_3$, the speed of the "floating car" again equals that of the Type II reference car, and then continues to increase. This development leads to a checking of the situation, which is now the opposite of entry into the traffic jam. In this case, the "floating car" overtakes the Type II reference car, allowing that the two vehicles start travelling at the same speed v(t) (or $v_{min}$) at timepoint $t_3$. At timepoint $t_4$, the "floating car" is so far ahead that a predetermined threshold value identifying the dissolution of the traffic jam is exceeded.

The present invention permits a traffic center to obtain traffic data precisely, i.e., with slight information loss, and in a highly up-to-date manner, and at the same time ensures a drastic reduction in data transmission expense. The change in data collection parameters that, according to the invention, can be carried out in the "floating cars" by means of the traffic center makes it possible to react correctly to specific traffic situations at all times. In particular, this means that the frequency of data transmissions from individual "floating cars" can be deliberately increased or decreased, as needed. If a vehicle is located in a traffic jam for a long time, for example, it can generally be assumed that the vehicle will send no reports during this period. Only after the vehicle passes through the congested area or the traffic jam clears up will a data transmission again take place.

I claim:

1. A process for obtaining traffic situation data in a compressed form, while largely maintaining data reliability, comprising the steps of:

determining a speed profile with a vehicle that moves in traffic and belongs to a sampling vehicle fleet;

wirelessly transmitting speed profile data to a traffic center from time to time;

continually determining current speed values of the vehicle, in the vehicle;

in the vehicle, determining characterizing numbers that characterize discrete segments of the vehicle speed profile from the current speed values, the characterizing numbers being characteristic of a curve of the speed actually travelled in a given segment;

continuously forming the discrete segments of the speed profile during a vehicle trip, by defining an end of a current segment, and thus a beginning of a new segment, based on results of a comparison between the speed profile of the vehicle and a speed profile of at least one virtual reference vehicle; and when a new segment begins, storing the characterizing numbers of current segment just finished in the vehicle at least until being transmitted to the traffic center.

2. A process as defined in claim 1, including forming the speed profile as a chronological speed profile.

3. A process as defined in claim 1, including determining, in the vehicle, starting at a predetermined point of the trip, an average travel speed based on the speeds actually travelled by the vehicle, and defining a first virtual reference vehicle which moves at this average travel speed.

4. A process as defined in claim 3, including forming the average travel speed as one of an arithmetic average and a sliding average.

5. A process as defined in claim 3, including dividing the entire trip of the vehicle into sections, such that a new section begins whenever the vehicle changes to a road of a different type than that previously travelled, and individually adjusting individual process features for a new section to the road type of that section, wherein the average travel speed of the first virtual reference vehicle is determined separately for the individual sections of the trip.

6. A process as defined in claim 3, including initiating a checking procedure for determining whether a new segment is formed when the current speed of the vehicle and the current travel speed of the first virtual reference vehicle fulfill a predetermined first relation, and one of terminating the checking procedure with a positive result and interrupting the checking procedure as soon as the current speed of the vehicle and the current travel speed of the first virtual reference vehicle fulfill a predetermined second relation.

7. A process as defined in claim 6, wherein the first relation and the second relation are equal.

8. A process as defined in claim 6, wherein the first relation is equality between the current speed of the vehicle and the current travel speed of the first virtual reference vehicle.

9. A process as defined in claim 6, wherein the step of determining characterizing numbers includes determining the characterizing numbers continuously by value updating, whereby the characterizing number determination for a potential new segment is initiated parallel to the characterizing number determination of the current segment and results already reached by the characterizing number determination for the current segment are stored when the checking procedure is initiated.

10. A process as defined in claim 6, including defining a new segment when respective distances travelled by the vehicle and the first virtual reference vehicle since a starting timepoint of the checking procedure differ by more than a predetermined first threshold value, the starting timepoint of the checking procedure serving as the beginning of the new segment.

11. A process as defined in claim 10, including dividing the entire trip of the vehicle into sections, such that a new section begins whenever the vehicle changes to a road of a different type than that previously travelled, and individually adjusting individual process features for a new section to the road type of that section, and further including predetermining the first threadhold value for the difference between the respective distances travelled by the vehicle and the first virtual reference vehicle in dependence on the road type.

12. A process as defined in claim 1, wherein the characterizing numbers of the segments include, at least, data that unambiguously establish a beginning and an end of the respective segments and data that represent an average value of the speed of the vehicle in each segment.

13. A process as defined in claim 12, including forming the average segment speed as one of an arithmetic average and a sliding average.

14. A process as defined in claim 12, wherein the step of determining characterizing numbers includes determining a variance of the speed of the vehicle in a given segment, in addition to the average segment speed.

15. A process as defined in claim 1, including dividing the entire trip of the vehicle into sections, such that a new section begins whenever the vehicle changes to a road of a different type than that previously travelled, and individually adjusting individual process features for a new section to the road type of that section.

16. A process as defined in claim 15, including providing a navigation device in the vehicle for determining the road type.

17. A process as defined in claim 15, including autonomously determining the road type in the vehicle by analyzing driving data characteristic of the road type.

18. A process as defined in claim 1, including temporarily storing the values of the determined current vehicle speeds in the vehicle before determining the characterizing numbers of the given segment.

19. A process as defined in claim 1, wherein the transmitting step includes transmitting the characterizing numbers to the traffic center whenever a new segment is formed.

20. A process as defined in claim 1, wherein the transmitting step includes transmitting the stored data to the traffic center whenever the vehicle falls below a predetermined minimum speed, and the distance travelled by the vehicle starting at a timepoint when the vehicle falls below the predetermined minimum speed differs from a distance travelled in the same period of time by a second virtual reference vehicle, which moves constantly at the predetermined minimum speed, by more than a predetermined second threshold value.

21. A process as defined in claim 20, including storing several minimum speed values useable in dependence on at least one of traffic situation and type of road travelled, for defining the second virtual reference vehicle.

22. A process as defined in claim 1, wherein the transmitting step includes transmitting the characterizing numbers to the traffic center whenever the stored data has a scope that reaches approximately a standard data packet size of a mobile telephone network used for data transmission.

23. A process as defined in claim 1, and further comprising the step of wirelessly transmitting current parameter settings to be used in the vehicle from the traffic center to the vehicle.

* * * * *